(12) United States Patent
Park et al.

(10) Patent No.: US 6,851,712 B2
(45) Date of Patent: Feb. 8, 2005

(54) STEERING TILT COLUMN ASSEMBLY FOR VEHICLE

(75) Inventors: Jung-Sik Park, Wonju (KR); Byung-Hwan Lee, Kangwon-do (KR)

(73) Assignee: Mando Corporation, Kyunggi-do (KR)

( * ) Notice: Subject to any disclaimer, the term of this patent is extended or adjusted under 35 U.S.C. 154(b) by 0 days.

(21) Appl. No.: 10/405,991

(22) Filed: Apr. 2, 2003

(65) Prior Publication Data

US 2004/0195816 A1 Oct. 7, 2004

(51) Int. Cl.[7] ............................................... B62D 1/18
(52) U.S. Cl. ................................................... 280/775
(58) Field of Search ......................... 280/775, 777, 280/779; 74/492, 493

(56) References Cited

U.S. PATENT DOCUMENTS 5,339,706 A * 8/1994 Freeman ...................... 74/493
5,678,454 A * 10/1997 Cartwright et al. ........... 74/493
5,802,926 A * 9/1998 Thomas ....................... 74/493
5,806,890 A * 9/1998 Sugiki et al. ................ 280/775
5,813,289 A * 9/1998 Renick et al. ................ 74/493

* cited by examiner

Primary Examiner—Faye M. Fleming
(74) Attorney, Agent, or Firm—R. Neil Sudol; Henry D. Coleman; William J. Sapone

(57) ABSTRACT

A steering tilt column assembly for a vehicle. The steering tilt column assembly is capable of implementing a stable engaged state of an engaged fixing gear and driving gear for continuing a tilting state, removing some parts by directly operating an upward roation operation of a driving gear using a tilt lever, preventing a noise and loosening by preventing a bolt used for a lever hinge of a tilt lever from affecting to a rotation friction during a rotation of a tilt lever, increasing an impact absorbing effect and unit cost by improving a material and structure of an initial impact absorbing capsule used for a mounting bracket, and implementing an impact absorbing and fixed engagement without using a dual column by making an engaging structure of a lower portion of a column and a lower bracket have a cross sectional portion with a decreased diameter.

10 Claims, 18 Drawing Sheets

[Fig.1] Prior Art
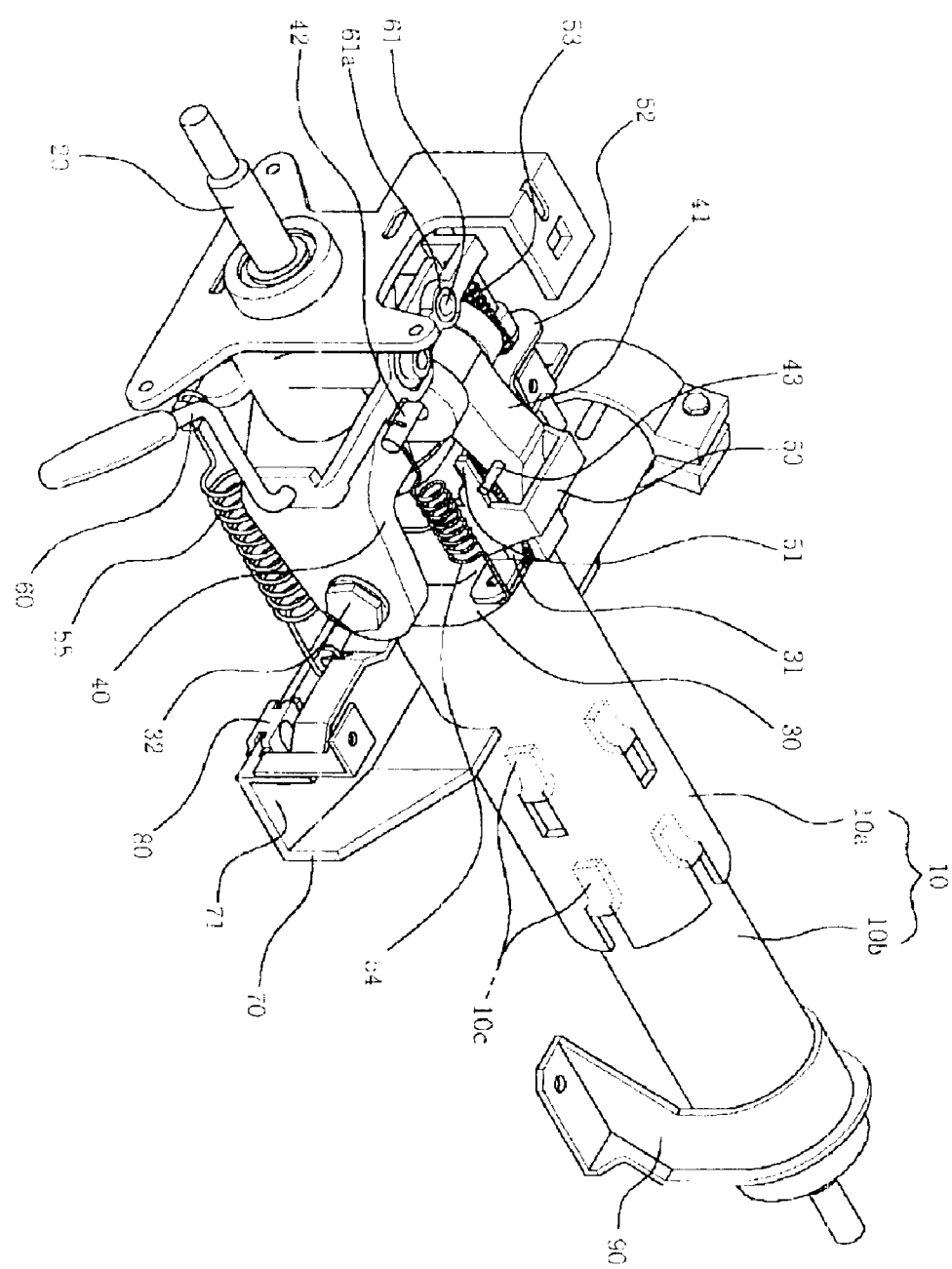

[Fig.2] Prior Art
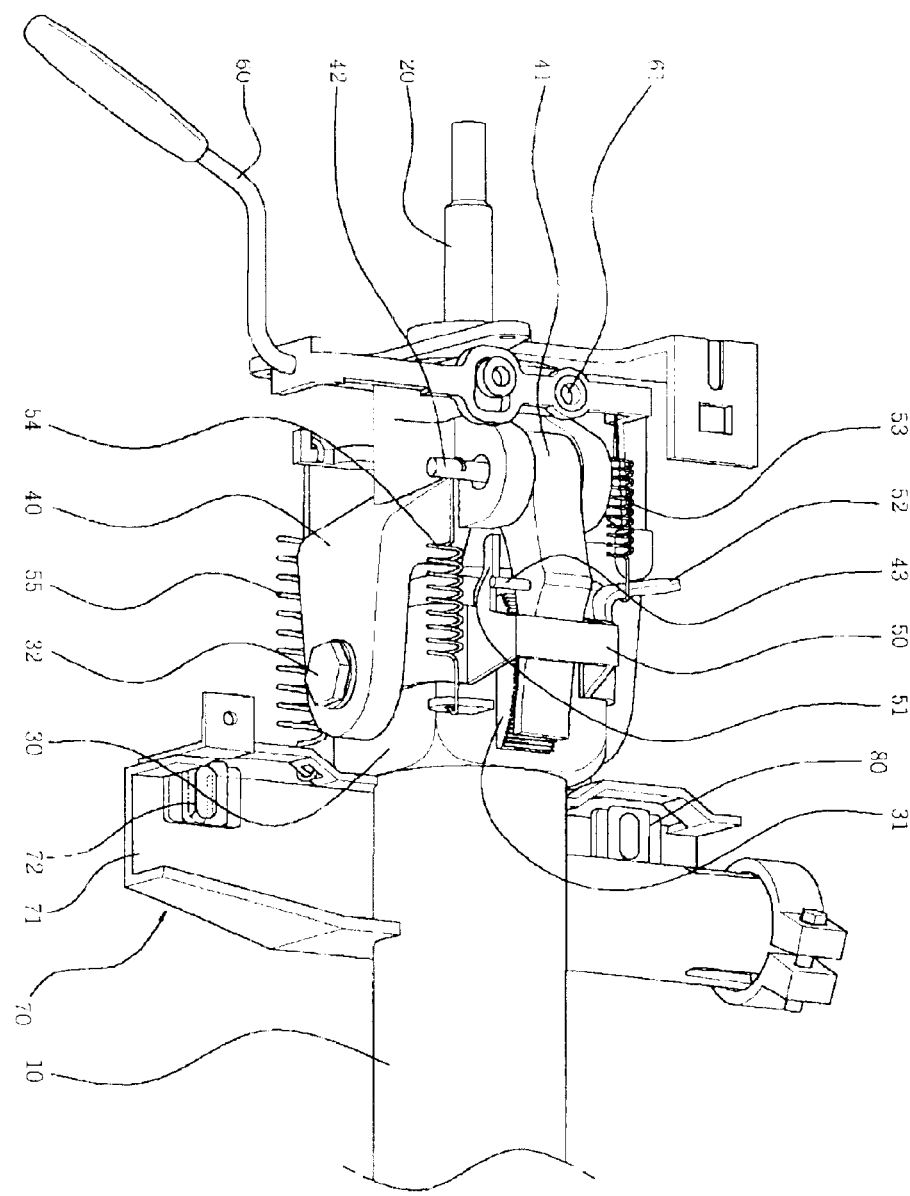

[Fig.3] Prior Art
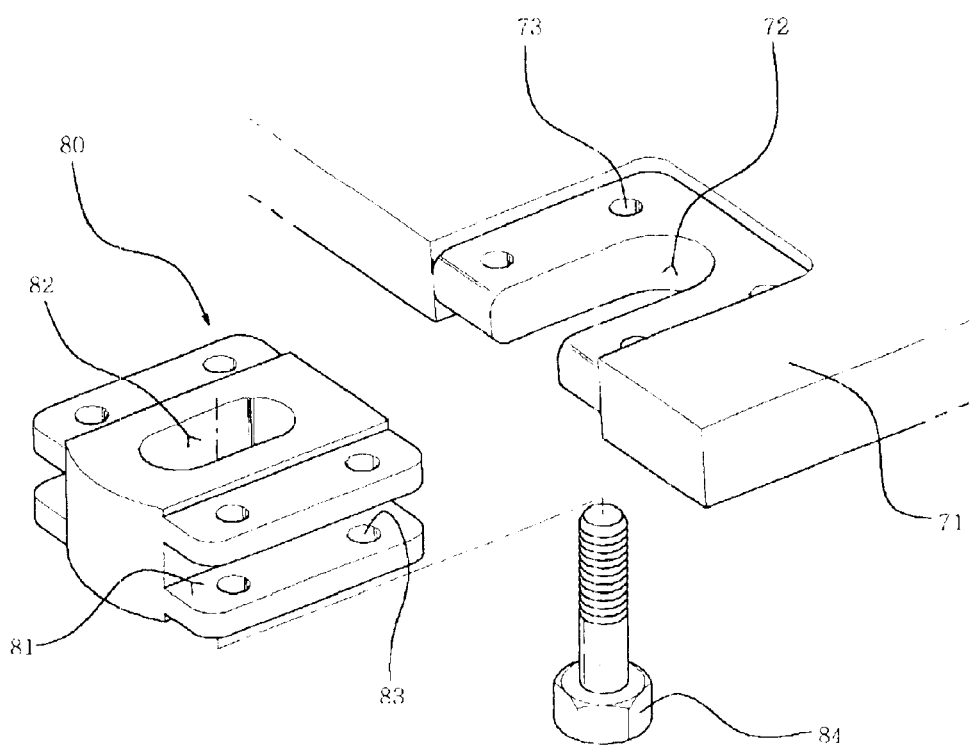

[Fig.4] Prior Art
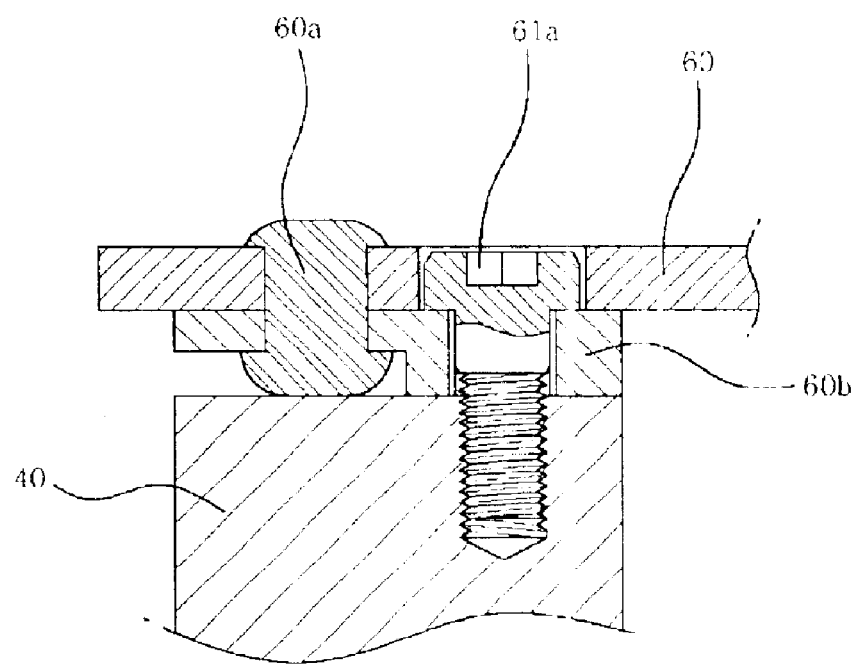

[Fig.5]
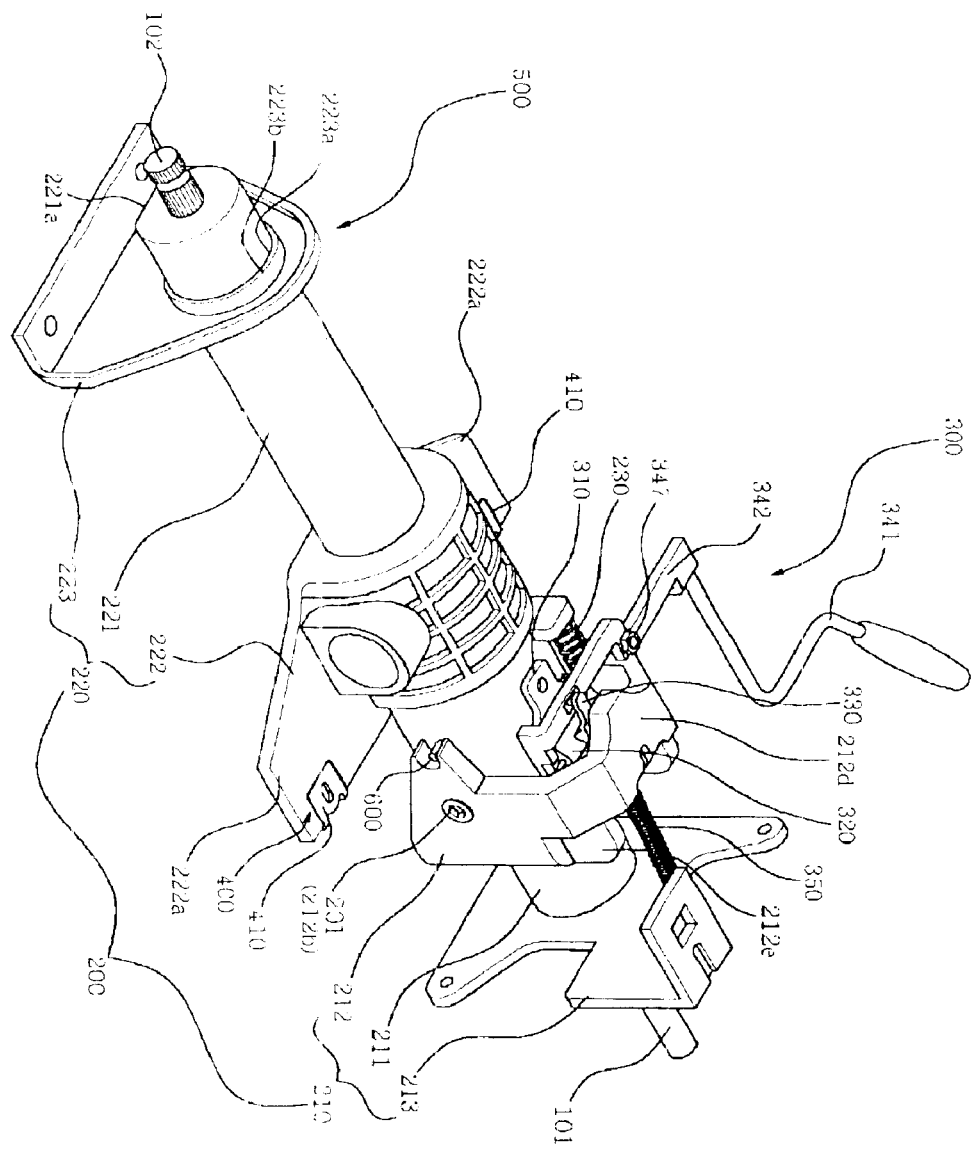

[Fig.6]
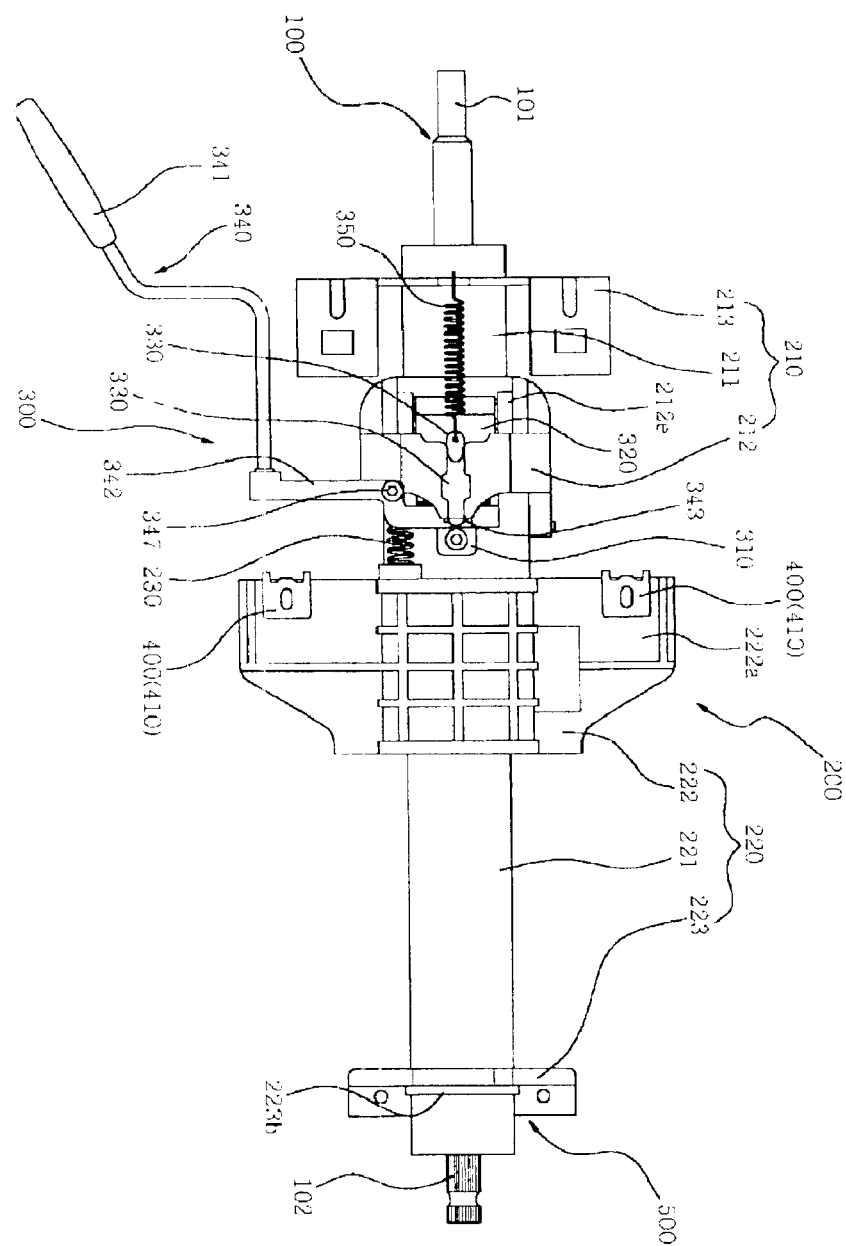

[Fig.7]
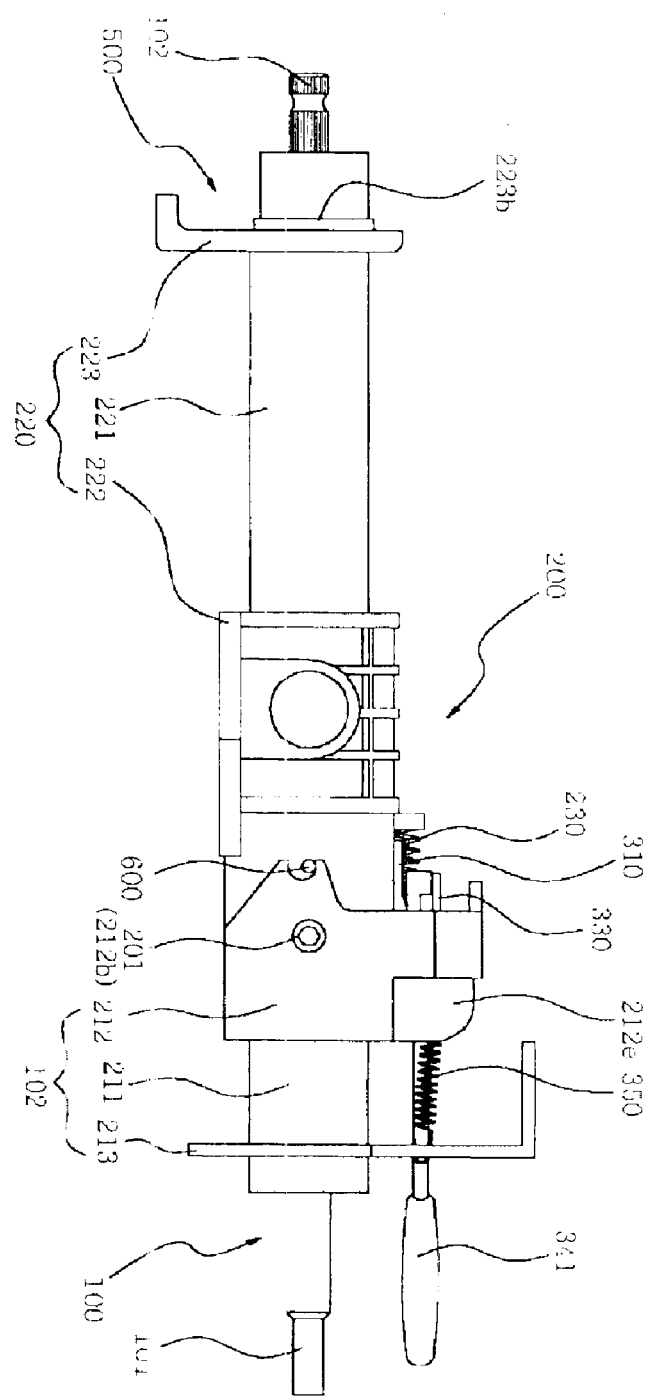

[Fig.8]
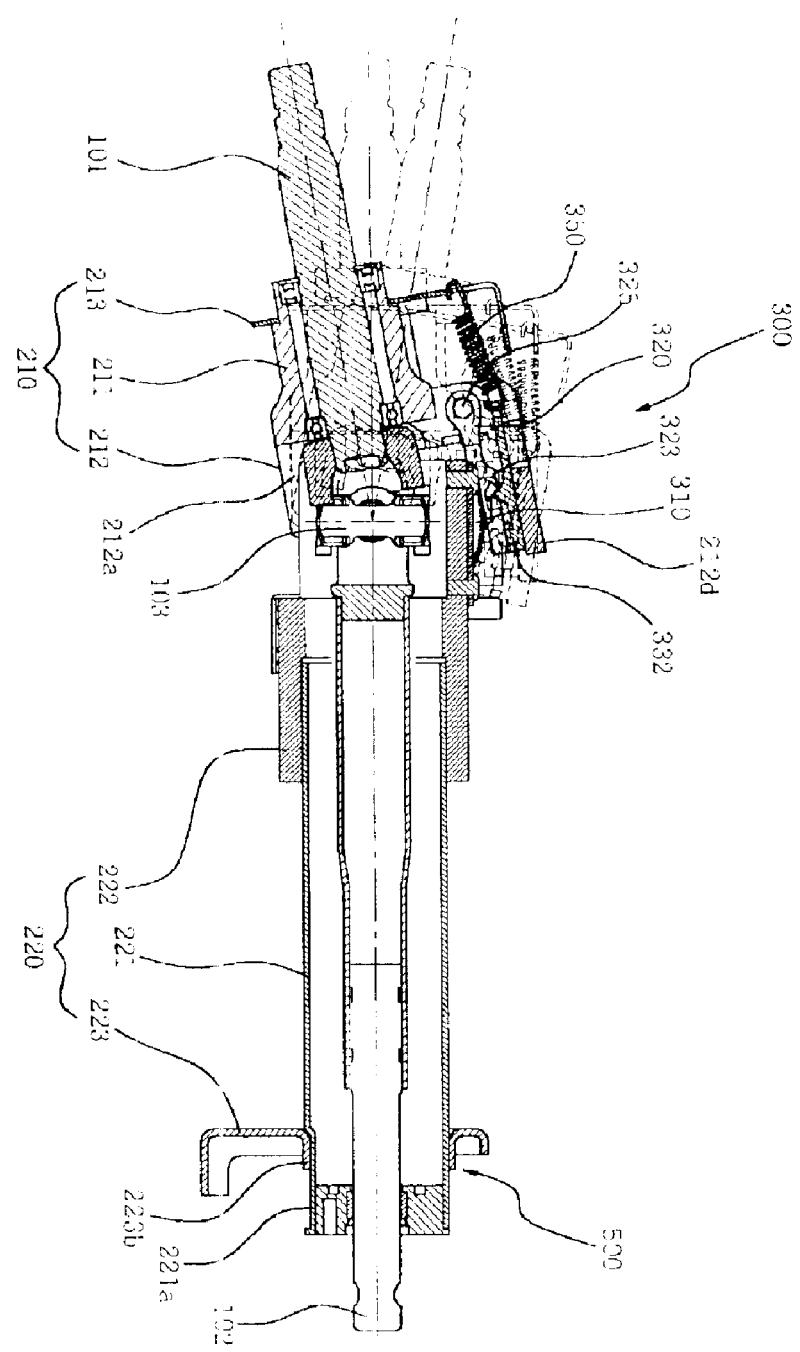

[Fig.9]
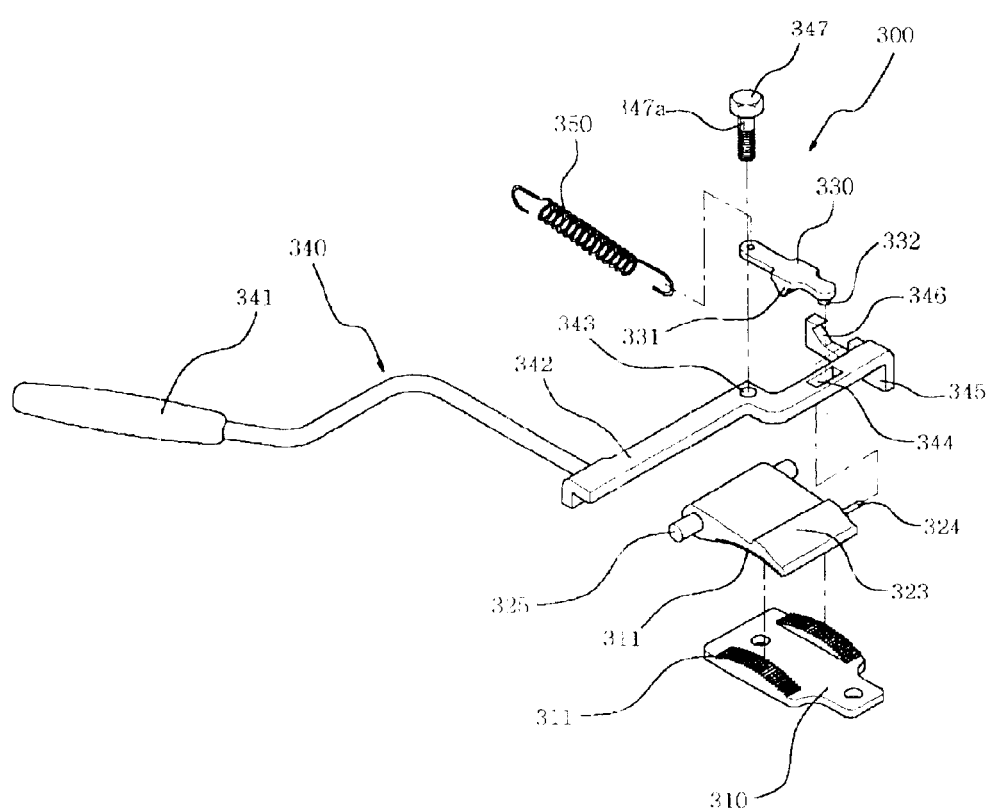

[Fig.10]
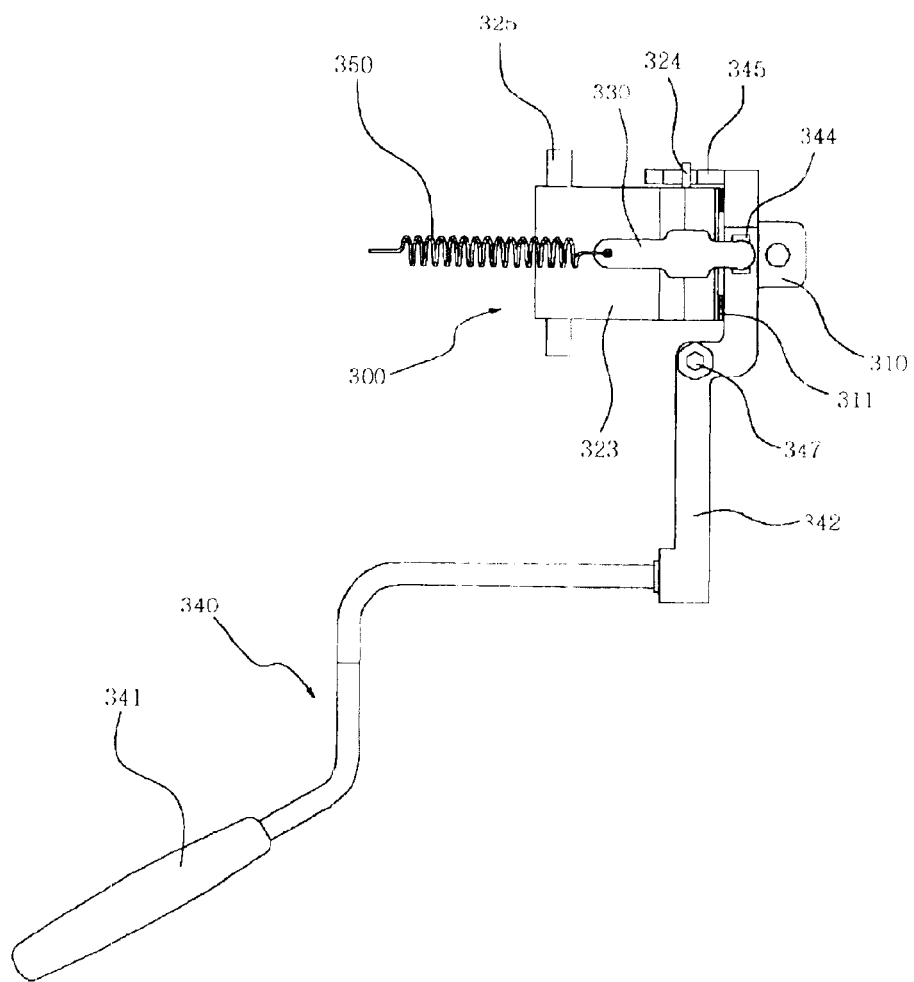

[Fig.11]
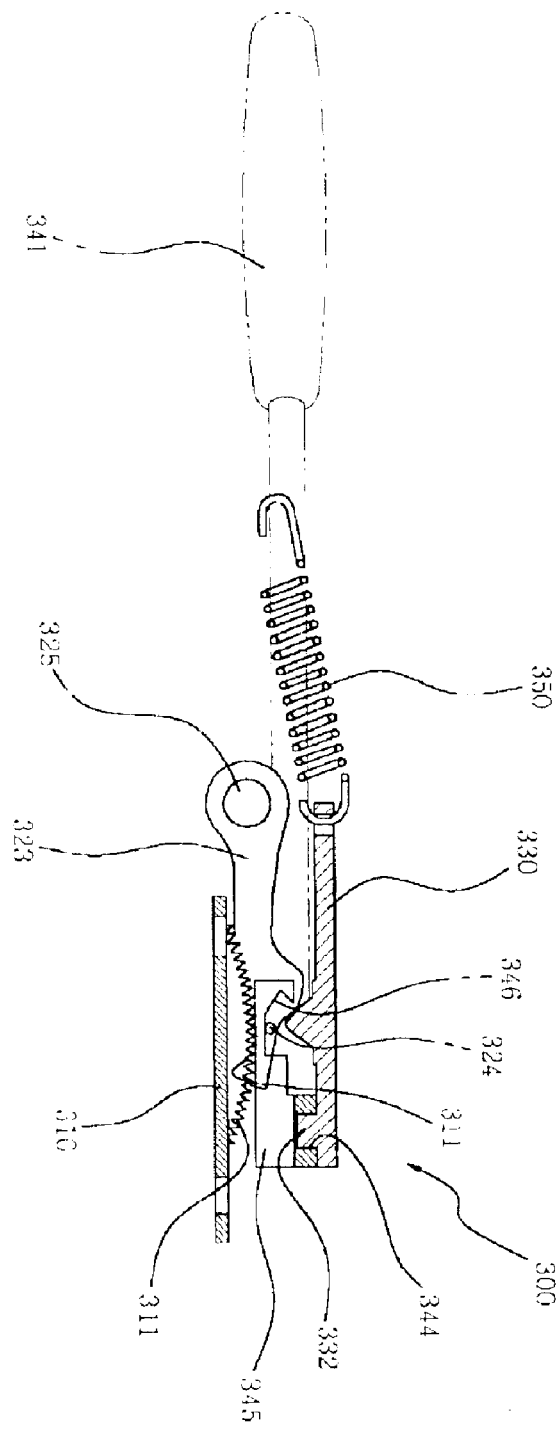

[Fig.12]
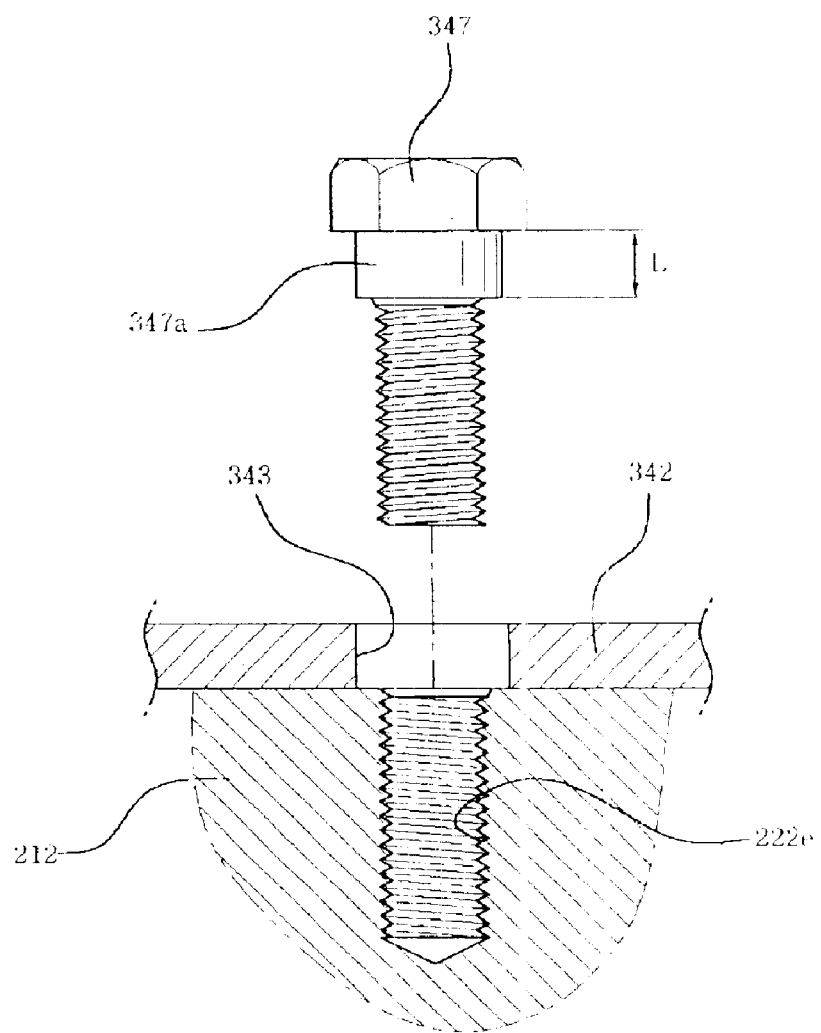

[Fig.13]
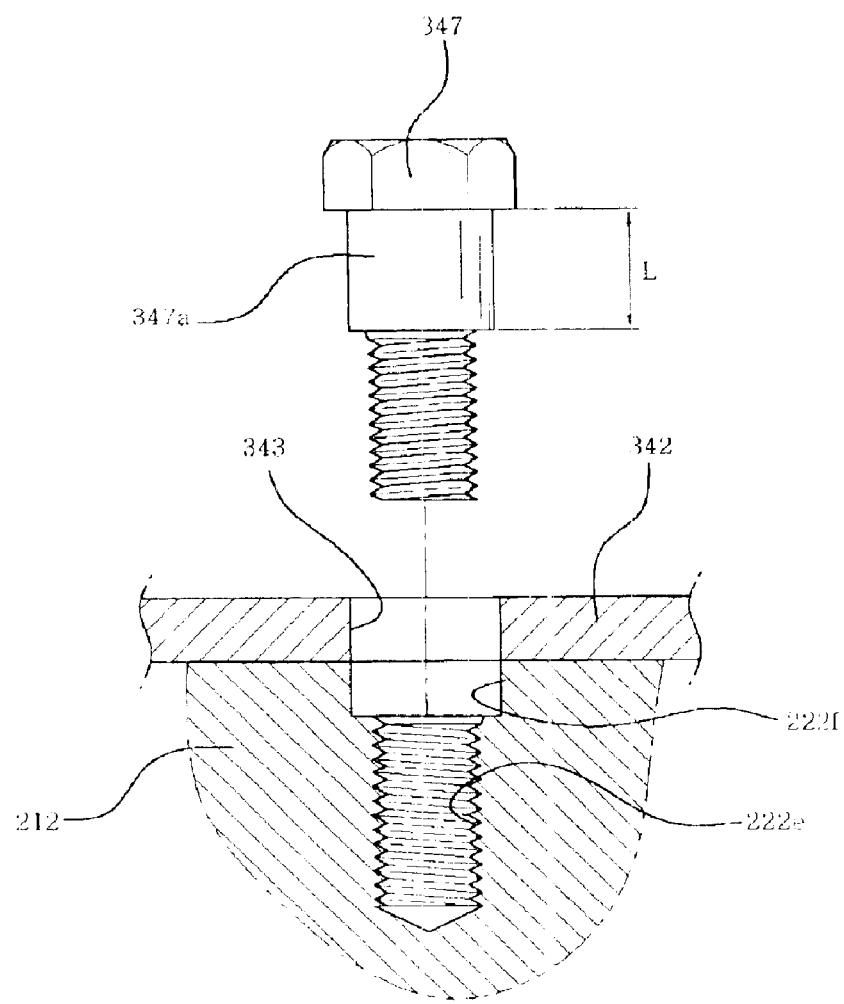

[Fig.14]
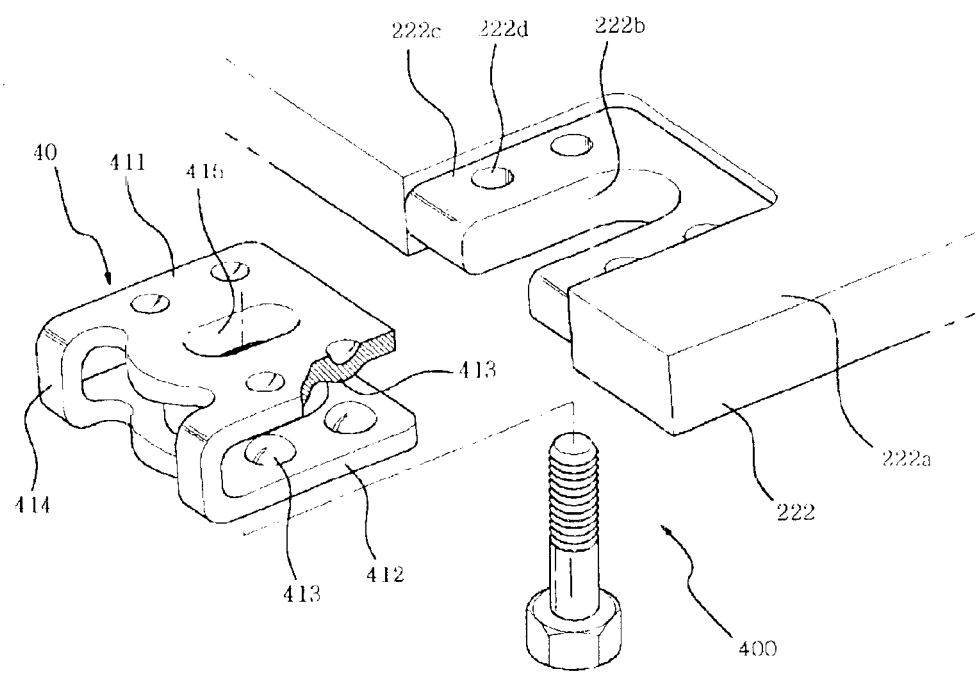
[Fig.15]
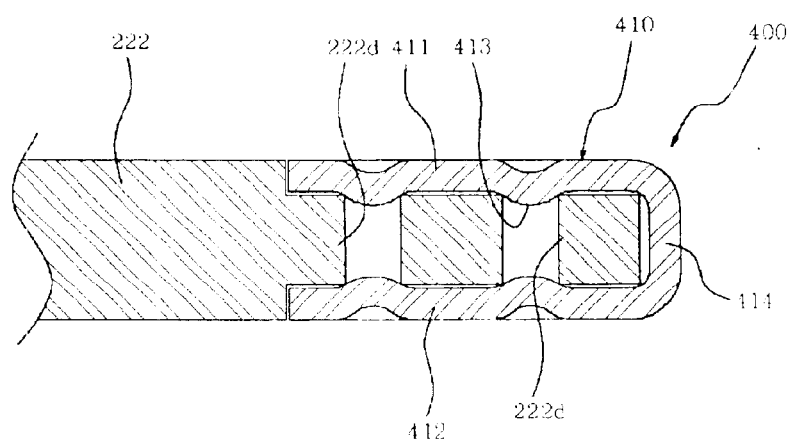

[Fig.16]
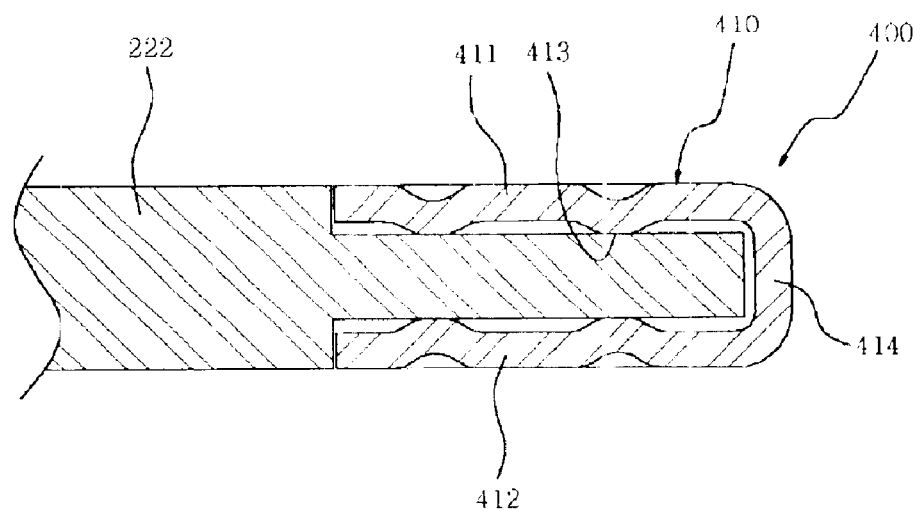
[Fig.17]
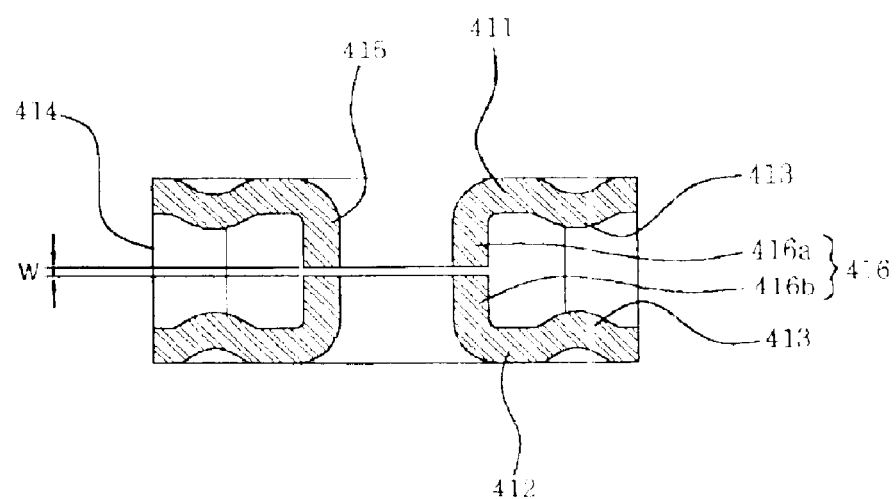

[Fig.18]
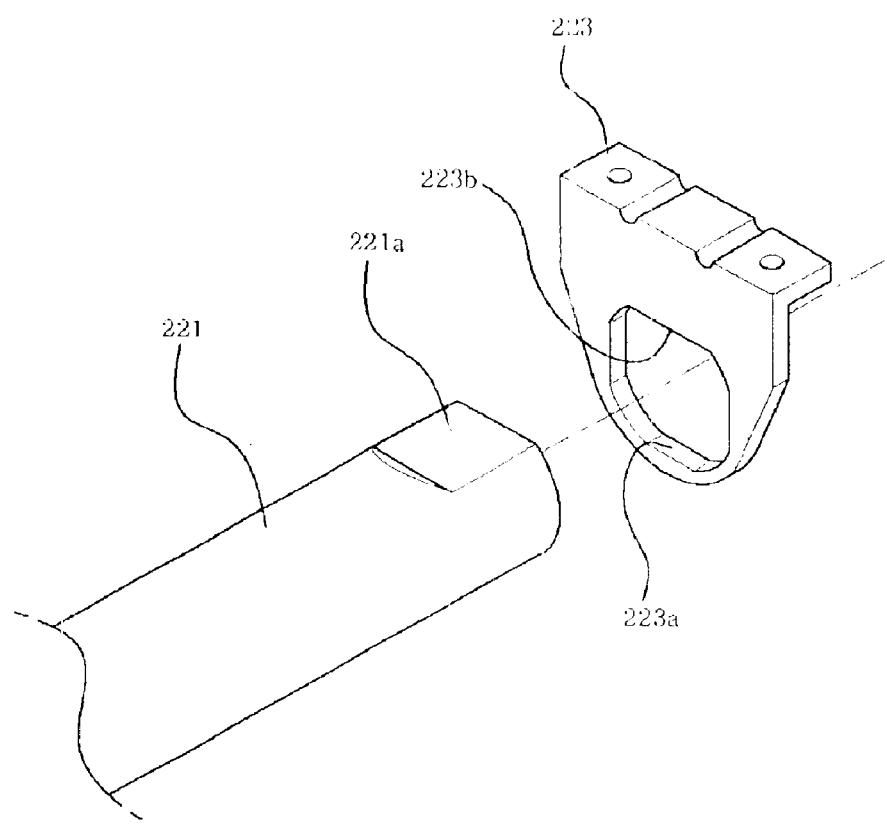

[Fig.19]
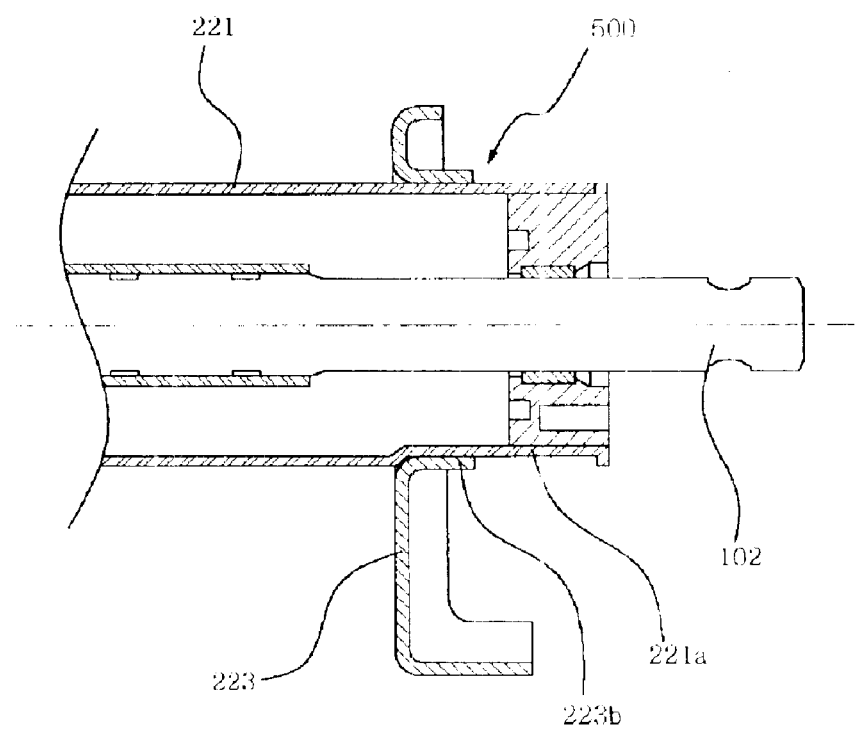

[Fig.20]
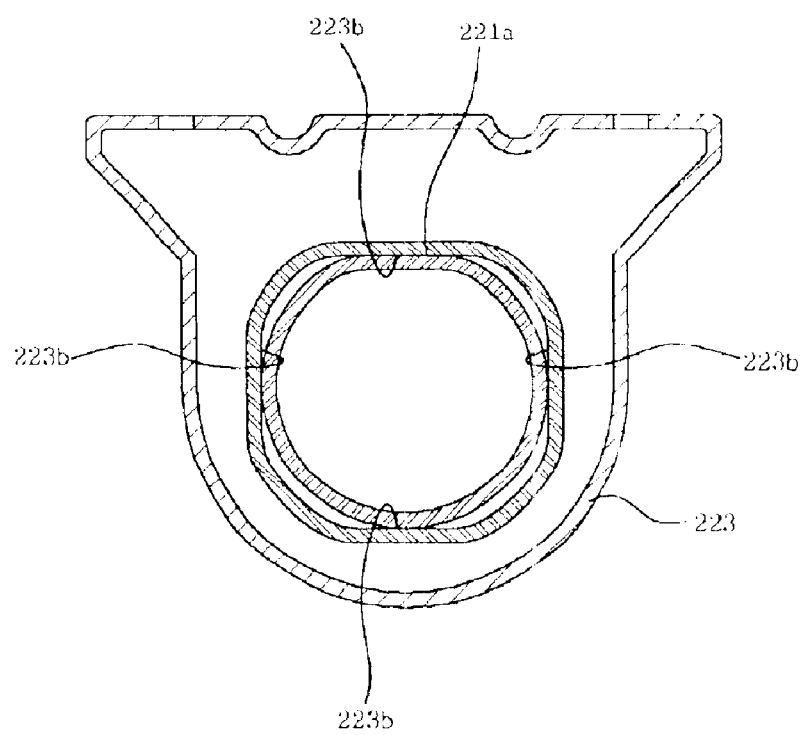

STEERING TILT COLUMN ASSEMBLY FOR VEHICLE

BACKGROUND OF THE INVENTION

1. Field of the Invention

The present invention relates to a steering tilt column assembly for a vehicle, and in particular to a steering tilt column assembly for a vehicle which is capable of implementing a stable engaged state of an engaged fixing gear and driving gear for continuing a tilting state, removing some parts by directly operating an upward rotation operation of a driving gear using a tilt lever, preventing a noise and loosening by preventing a bolt used for a lever hinge of a tilt lever from affecting to a rotation friction during a rotation of a tilt lever, increasing an impact absorbing effect and unit cost by improving a material and structure of an initial impact absorbing capsule used for a mounting bracket, and implementing an impact absorbing and fixed engagement without using a dual column by making an engaging structure of a lower portion of a column and a lower bracket have a cross sectional portion with a decreased diameter.

2. Description of the Background Art

Generally, a vehicle steering tilt column assembly is installed in an outer portion of a steering shaft 20 adapted to transfer a rotational force from a steering wheel to a gear box for thereby supporting a rotation of the same and connecting to a vehicle body.

FIG. 1 is a view illustrating a conventional steering tilt column assembly.

As shown in FIG. 1, a unit for connecting a steering tilt column assembly to a vehicle body includes a mounting bracket 70 fixed in an intermediate position of the column 10, a capsule 80 inserted into a slot at both sides of the mounting bracket, and a lower bracket 90 which is fixed in a lower position of the column 10 formed of an outer tube 10a and an inner tube 10b, namely, in a lower portion of the inner tube 10b.

The steering shaft 20 includes an upper and lower ends connected with a steering wheel and a gear box, respectively, and is connected with a universal joint adapted to transfer a rotational force in a bent state therebetween.

In addition, the steering column adapted to support the steering shaft includes a tilting apparatus adapted to maintain a bent state of the steering shaft and to adjust an angle of a steering wheel based on a driver's physical state.

FIG. 2 is a view illustrating the above tilting apparatus.

Here, a column bracket 30 is installed in an upper portion of the steering column 10. A tilt bracket 40 is installed in an outer portion at both sides of the column bracket 30 for surrounding the same. The column bracket 30 and the tilt bracket 40 are connected with both ends of the split steering shaft 20, respectively.

In addition, both sides of the column bracket 30 and the tilt bracket 40 are engaged to the tilt hinge 32, respectively, and when the steering shaft 20 installed in the interior of the same is bent, the same is bent by the universal joint (not shown) based on a cooperation of the same.

A circular shaped fixing gear 31 which as the same center as the tilt hinge 32 and a threaded portion in an outer surface of the same is installed in an outer one side of the column bracket 30. A driving gear 41 is formed in the tilt bracket 40 and is engaged with the fixing gear 31.

Namely, one end of the driving gear 41 is engaged to the gear hinge 42 in the tilt bracket 40, and a threaded portion engaged with a threaded portion of the fixing gear 31 is formed in an inner surface of the front end of the same and is elastically supported by a spring (not shown) based on a continuous engagement.

In addition, the tilt bracket 40 has a certain structure capable of rotating the driving gear 41 for angling the column bracket 30, the tilt bracket 40 and the steering shaft 20 by distancing the engaged driving gear 41 and the fixing gear 31.

Namely, there is provided a driving pin 43 protruded in one side of the driving gear 41. A rotation member 50 is installed in a lower side of the driving pin 43 for thereby lifting the driving gear 41 through the driving pin 43. The rotation member 50 is rotatably installed by the tilt hinge 32 at its center.

At this time, the rotation member 50 is installed between the tilt bracket 40 and the column bracket 30 in such a manner that opposite bent both ends of the same are passed through by the tilt hinge 32, and the intermediate portion of the same covers an outer surface of the driving gear 41. A rotation portion 51 is formed in a lower side of the driving pin 43.

The portion in which the rotation portion 51 of the rotation member 50 is formed is connected with the gear hinge 42 which is a rotation point of the driving gear 41 and is recovered after the operation of the rotation member 50. A recovering spring 54 is installed so that the tilt bracket 40 and the column bracket 30 are bent and recovered to their original positions.

Another recovering spring 55 is installed in the opposite portion of the recovering spring 54 with respect to the tilt hinge 32 so that the tilt bracket 40 and the column bracket 30 are bent to the other side and then are recovered.

In addition, A connection portion 52 which is longitudinally extended in the direction of the tilt bracket 40 and is bent is formed in the portion opposite to the rotation portion 51 of the rotation member 50. The above connection potion 52 is connected through an end portion of the tilt lever 60 in which an intermediate portion is rotatably fixed in the lever hinge 61 formed in the tilt bracket 40 and the connection spring 53.

Therefore, when pulling the handle of the tilt lever 60, an end portion of the tilt lever 60 pushes the connection portion 52, and the rotation member 50 is rotated. Therefore, the rotation portion 52 lifts up the driving gear 41, and the driving gear 41 and the fixing gear 31 are distanced for thereby implementing a tilting function.

The steering tilt column assembly has an impact absorbing structure.

As one of the functions, it is directed to implementing an initial impact absorbing function. There are provided a capsule 80 inserted into the mounting bracket 70, and a collapsing structure capable of implementing an impact absorbing function in the lower mounting portion.

As shown in FIG. 1, in the latter case, the steering column 10 is engaged with two hollow tubes of an outer tube 10a and an inner tube 10b for thereby contracting when an impact is transferred.

However, the conventional vehicle steering column tilting apparatus has the following problems.

First, since there are not any structure and apparatus for supporting the engagement of the fixing gear and the driving gear, the driving gear and the fixing gear are easily distanced when an external impact is transferred.

Namely, in the case that an abnormal external force or vibration occurs, since there is not any member for continuously preventing by pressing the driving gear 41 in the direction of the fixing gear 31, the driving gear 41 may be lifted up for thereby unlocking the locked state.

Second, the rotation member 50 is installed between the tilt bracket and the column bracket using a tilt hinge for thereby lifting the driving gear 41. However, the rotation member is formed of a thin steel plate rotating. Therefore, the strength is weak, and the rotation member 50 may be bent when an external impact is transferred, so that a pop-up problem (steering wheel is popped up) may occur. Furthermore, the rotation member 50 may be omitted by improving the structure.

Third, as shown in FIG. 1, in the steering column tilting apparatus, a common bolt 61a is engaged in the lever hinge 61 for rotatably fixing the tilt lever 60 in the tilt bracket 40.

The engagement of the bolt 61a will be described. As shown in FIG. 4, there are needed a plate 60b, a rivet 60a, a bolt 61a and a lever 60. In addition, a work process such as a bolt riveting portion of a tilt bracket is needed. Therefore, the fabrication cost is increased.

In addition, since the upper surfaces of the bolt 61a and the tilt lever 60 closely contacted, and the lower surface of the tilt lever 60 and the upper surface of the tilt bracket 40 are closely contacted, when the bolt 61a is strongly tightened, when the tilt lever 60 is rotated, a friction force is increased, so that it is difficult to handle. In addition, the bolt is too loosely tightened, a noise occurs, and the bolt 61a is gradually loosened.

Fourth, there are problems in the capsule 80 adapted to fix the mounting bracket 70 to a vehicle body and a structure for assembling the capsule.

In the mounting bracket 70, an intermediate portion of the same surrounds the upper side of the steering column 10, and an expanding portion 71 is formed in extended both sides and is opposite to the vehicle body. A slot 42 which is opened in the upper side is formed in the expanding portion 71. In addition, the capsule 80 is formed by injecting aluminum. An insertion groove 81 is formed in both sides in order for an outer surface of the slot 72 to be inserted thereinto. A bolt hole 82 is formed in the center, so that the bolt 84 passes through the same and is fixed to the vehicle body.

As shown in FIG. 3, a plurality of capsule holes 83 and slot holes 73 which pass through the upper and lower sides are formed in the engaged outer surfaces of the capsule 80 and the slot 72. A plastic melting material is injected in the interior of the same for thereby hardening the same and forming a pin shape.

Namely, the hardened plastic melting material connects the capsule 80 fixed to the vehicle body and the mounting bracket 70 fixed to the steering column 10. When an external impact is applied to the steering column 10, the plastic melting material is broken, so that the steering column 10 is separated from the capsule 80.

However, in the escaping apparatus of a conventional steering column, the capsule and the basic structure of the mounting bracket engaged thereto are complicated. In addition, a complicated process for injecting a plastic melting material and hardening the same in the slot hole communicating with the capsule hole formed in the capsule is needed. Therefore, the installation process is complicated, and the fabrication cost is increased.

Furthermore, when managing the weights using a fixing pin formed of plastic, since the weight managing limit is low based on the property of the material, the applicable range is limited. In order to overcome the above problems, when the number and thickness of the fixing pin are adjusted, the structure may be more complicated.

Fifth, there is a problem in the impact absorbing structure formed of the steering column 10 and the lower bracket 90 adapted to support the lower portion of the steering column.

The important points of the impact absorbing structure are that a lower bracket should be used for fixing the lower portion of the column to the vehicle body. Since the lower bracket of the lower portion of the column is integrally welded, an additional inner tube must be used for implementing an impact absorbing structure. In addition, the lower bracket must be welded to the lower portion of the inner tube.

FIG. 1 is a view illustrating the conventional impact absorbing structure.

Namely, a collapsing problem occurs between the outer tube 10a which surrounds the steering shaft 20 and the inner tube 10b fixed to the lower bracket for thereby absorbing an impact energy when a vehicle collides. The inner tube 10b is fixed to the vehicle body by the lower bracket 90, and one end of the same is engaged to an inner surface of the outer tube 10a. A plurality of curling portions 10c are formed along an outer circumference in the inner surface of the outer tube 10a.

In particular, the above formation of the curling potion 10c is performed in such a manner that the portions remaining piercing operations are formed in the outer tube 10a are inwardly rolled. The above curling portion 10c is assembled to the end portion of the inner tube 10b for thereby implementing a friction force.

Therefore, when an impact energy is applied through the steering shaft 20 when a vehicle collides, the end portion of the inner tube 10b of the lower mounting portion makes a friction with the curling portion 10c of the outer tube 10a, so that a collapsing operation is performed for thereby absorbing the impact energy.

However, in the above structure, when the outer tube 10a and the inner tube 10b are assembled, the curling portion 10c may be broken based on the material for thereby causing an error product. In particular, the process for forming the curling portion 10b in the outer tube 10a is very complicated. In addition, the inner tube must be added. Therefore, the number of parts is increased.

SUMMARY OF THE INVENTION

Accordingly, it is an object of the present invention to provide a steering tilt column assembly for a vehicle which overcomes the problems encountered in the conventional art.

It is another object of the present invention to provide a steering tilt column assembly for a vehicle which is capable of implementing a stable engagement of a fixing gear and a driving gear for obtaining a desired tilting state by providing a guard portion in an upper portion of a tilt bracket and a wedge in a lower portion of the guard portion for thereby enhancing a stability of a tilting state.

It is further another object of the present invention to provide a steering tilt column assembly for a vehicle which is capable of removing a conventional rotation member and increasing a productivity and decreasing a fabrication cost by directly performing an upward rotation operation of a driving gear using a tilt lever and increasing a productivity and decreasing a fabrication cost.

It is still further another object of the present invention to provide a steering tilt column assembly for a vehicle which is capable of preventing an engaging force of a bolt from affecting a rotation friction when a tilt lever is rotated by using a bolt having a step straight line portion for a bolt of a lever hinge portion of a tilt lever and preventing a noise in a tilt lever and a bolt from being loosened.

It is still further another object of the present invention to provide a steering tilt column assembly for a vehicle which is capable of implementing an easier fabrication and lower price by improving a material and structure of an initial impact absorbing capsule used in a mounting bracket and implementing a desired impact absorption based on only friction force between the capsule and a mounting bracket.

It is still further another object of the present invention to provide a steering tilt column assembly for a vehicle which is capable of implementing a stable engagement and a desired impact absorption when an impact is applied by providing an engaging structure of a lower portion of a column and a lower bracket having a cross section with a decreased diameter.

To achieve the above objects, in a steering column which includes a steering shaft which includes an upper side shaft and a lower side shaft connected with a universal joint in their lower and upper ends, an upper unit which is formed of an upper side tube which includes a steering shaft and surrounds a surrounding portion of the upper side shaft, a tilt bracket connected with the upper side tube, and a shroud bracket for fixing the above elements to a vehicle body, and a lower unit which is formed of a lower side tube which surrounds a surrounding portion of the lower side shaft, a column bracket which is connected with an upper end of the lower side tube and has a capsule assembling slot in left and right wing portions, and a lower mounting bracket adapted to fix a lower end of the lower side tube to a vehicle body, wherein hinge pin holes formed in left and right sides of the tilt bracket and hinge pin holes formed in left and right sides of the column bracket are engaged using a hinge pin, so that the upper unit including the upper side shaft is bent at a certain angle about the hinge pin with respect to the lower unit including the lower side shaft, there is provided a steering tilt column assembly for a vehicle which includes a tilting adjusting unit which includes a fixing gear and a driving gear between the column bracket and the tilt bracket, the tilting adjusting unit including a fixing gear which is fixed to an upper surface of the column bracket and has a threaded portion in an upper side surface, a driving gear in which a threaded portion of a lower surface is engaged to a threaded portion of the fixing gear, and a protrusion is formed in the upper surface of the same, the driving gear being rotatable on the tilt bracket, a wedge member which has a wedge portion in a lower surface for pressing the protrusion of the driving gear and has a connection protrusion in a lower surface of the front end, a tilt lever which is formed of an engaging hole into which a connection protrusion of the wedge member is inserted, and a hinge hole which is rotatable on the tilt bracket by inserting a hinge bolt, a handle portion extended from one end of the horizontal portion, and an extended portion which is connected with the other end of the horizontal portion and has an inclination portion for lifting up a side surface protrusion of the driving gear, a spring for pulling the wedge member and the tilt lever in a certain direction, and an extension spring adapted to return the tilt lever to an original position when the tilt lever is rotated.

BRIEF DESCRIPTION OF THE DRAWINGS

The present invention will become better understood with reference to the accompanying drawings which are given only by way of illustration and thus are not limitative of the present invention, wherein;

FIG. 1 is a perspective view illustrating a conventional steering column assembly;

FIG. 2 is a perspective view illustrating a tilting structure of a conventional steering column;

FIG. 3 is a perspective view illustrating a conventional capsule and assembled state;

FIG. 4 is a cross sectional view illustrating a structure of a conventional hinge bolt;

FIG. 5 is a perspective view illustrating the whole construction of a steering tilt column assembly for a vehicle according to the present invention;

FIG. 6 is a plan view illustrating the whole construction of a steering tilt column assembly for a vehicle according the present invention;

FIG. 7 is a bottom view illustrating the whole construction of the present invention;

FIG. 8 is a front cross sectional view illustrating the whole construction of a steering tilt column assembly for a vehicle according to the present invention;

FIG. 9 is a disassembled perspective view illustrating the construction of major elements of a tilting adjusting unit according to the present invention;

FIG. 10 is a plan view illustrating an operation state of a tilting adjusting unit according to the present invention;

FIG. 11 is a front cross sectional view illustrating an operational state of a tilting adjusting unit according to the present invention;

FIG. 12 is a cross sectional view illustrating a hinge portion of a tilt lever according to the present invention;

FIG. 13 is a cross sectional view illustrating a hinge portion of a tilt lever according to another embodiment of the present invention;

FIG. 14 is a view illustrating the construction of an initial impact absorbing unit according to the present invention;

FIG. 15 is a cross sectional view illustrating a capsule and assembled state according to the present invention;

FIG. 16 is a cross sectional view illustrating a capsule mounting groove according to another embodiment of the present invention;

FIG. 17 is a cross sectional view illustrating a capsule according to the present invention;

FIG. 18 is a view illustrating the construction of a lower side impact absorbing unit according to the present invention;

FIG. 19 is a cross sectional view illustrating an assembled state of a lower side impact absorbing unit according to the present invention; and FIG. 20 is a view illustrating the construction of a lower side impact absorbing unit according to another embodiment of the present invention.

DESCRIPTIONS OF REFERENCE NUMERALS
OF MAJOR ELEMENTS OF THE DRAWINGS

100: steering shaft
101: upper side shaft
102: lower side shaft
103: universal joint
200: steering column
201: hinge pin
210: upper unit
211: upper side tube 212: tilt bracket
213: shroud bracket
220: lower unit
221: lower side tube
222: column bracket
223: lower mounting bracket
230: tension spring
300: tilting adjusting unit
310: fixing gear
311: threaded portion
320: driving gear
321: threaded portion
323: protrusion
324: side surface protrusion
325: shaft pin
330: wedge member
331: wedge portion
332: connection protrusion
340: tilt lever
341: handle
342: horizontal portion
343: lever hinge hole
344: engaging hole
345: extended portion
346: inclination portion
347: hinge bolt
350: spring
400: initial impact absorbing unit
410: capsule
411: upper plate
412: lower plate
413: protrusion
414: electric portion
415: bolt hole
500: lower side impact absorbing unit

DETAILED DESCRIPTION OF THE PREFERRED EMBODIMENTS

The construction and operation of the present invention will be described with reference to the accompanying drawings.

FIG. 5 is a perspective view illustrating the whole construction of a steering tilt column assembly for a vehicle according to the present invention, FIG. 6 is a plan view illustrating the whole construction of a steering tilt column assembly for a vehicle according the present invention, and FIG. 7 is a bottom view illustrating the whole construction of the present invention.

As shown therein, a steering tilt column assembly according to the present invention includes a steering shaft 100 which is formed of an upper side shaft 101 and a lower side shaft 102 connected by a universal joint 103 in their lower and upper portions, an upper side tube 211 which includes the steering shaft 100 and surrounds the surrounding portion of the upper side shaft 101, a tilt bracket 212 connected to the upper side tube, an upper unit 210 which includes a shroud bracket 213 for fixing the above elements to a vehicle body, a lower side tube 221 which surrounds the surrounding portion of the lower side shaft 102, a column bracket 222 which has a capsule assembling slot 222b in a left and right wing portion 222a in a connected state to an upper portion of the lower side tube, and a lower unit 220 which includes a low mounting bracket 223 for fixing a lower portion of the lower side tube 221 to a vehicle body.

Therefore, a tilting operation is implemented by connecting a hinge pin hole 212b formed in left and right sides of the tilt bracket 212 and a hinge pin hole 212b formed in left and right sides of the column bracket 222 using a hinge pin 201.

Namely, as shown in FIG. 7, the upper unit 210 which includes the upper side shaft 101 with respect to the lower unit 220 including the lower side shaft 102 is bent at a certain angle about the hinge pin 201. The tilting adjusting unit 300 according to the present invention adapted to implement the above tilting operation will be described with reference to FIG. 9.

There are provided a fixing gear 310 which is fixed to an upper surface of the column bracket 222 and has a threaded potion 311 in the upper surface of the same, a driving gear 320 which has a protrusion 323 of the upper surface and is rotatable on the tilt bracket 212 and is constructed in such a manner that the threaded portion 321 of the lower surface is engaged to the threaded portion of the fixing gear, and a wedge member 330 which has a wedge portion 331 adapted to press the protrusion 323 of the driving gear 320 and a connection protrusion 332 in the lower surface of the front end.

At this time, the fixing gear 310 is fixed in a conventional manner using an engaging bolt. The driving gear 320 is upwardly and downwardly rotatable by inserting the rear end of the same between the hinge support ribs 212e protruded from both sides of the upper surface of the tilt bracket 212, and the shaft pin 325 passes through in a horizontal direction.

In the tilt bracket 212 according to the present invention, as an important element, the guard portion 212d which is formed across both sides in the portion higher than the hinge support ribs 212e protruded for installing the driving gear is provided, so that it is possible to press the upper surface of the wedge member 330.

The wedge member 330 and the driving gear 320 positioned in the lower portion of the guard portion 212d are operated by the tilt lever 340.

The tilt lever 340 includes a horizontal portion 342 which has a hinge hole 343 for a rotatable engagement on the tilt bracket 212 by inserting the engaging hole 344 into which the connection protrusion 332 of the wedge member 330 is inserted and the hinge bolt 347, a handle 341 which is extended from one side end of the horizontal portion 342, an extended portion 345 extended from the other side of the horizontal portion 342, and an inclination portion 346 which is inclined for lifting the side surface protrusion 324 of the driving gear 320.

In addition, as shown in FIG. 12, the tilt lever 340 is engaged by the hinge bolt 347 for thereby implementing a stable rotation.

The hinge bolt 347 which has a hinge point obtained by inserting the same into the hinge hole 343 of the horizontal portion 342 of the tilt lever 340 is engaged based on a straight line portion 347a in the lower portion of the bolt head.

The straight line portion 347a has a diameter D larger than the diameter of the screw portion of the bolt and a length L longer than the thickness of the horizontal portion 342 or a (+) tolerance. Therefore, when engaged using the hinge bolt 347, since the horizontal portion 342 is not pressed by the bolt head, the horizontal portion 342 does not have a friction resistance.

At this time, as shown in FIG. 13, the hinge bolt 347 according to the present invention may be implemented in another embodiment of the present invention. Namely, as shown in FIG. 13, an expanding hole 222f is formed in an upper portion of the threaded hole 222a to which the hinge bolt 347 is engaged, and a part of the straight line portion 347a of the hinge bolt 347 is inserted into the expanding hole 222f. At this time, the length L of the straight line portion 347a is the size that the depth d of the expanding hole 222f is added with the thickness of the horizontal portion 342. The allowable tolerance is (+), not (−).

In addition, the above engagement is performed for the reason that it is possible to prevent a movement of the hinge bolt 347 and increase the engaging force.

In addition, a tension spring 230 is connected between the wedge member 330 and the shroud bracket 213 for pulling the wedge member 330 in one direction. A tension spring 230 is connected between the tilt lever 340 and the shroud bracket 213 for returning the tilt lever 340 to its original position when the same is rotated.

In the present invention, an initial impact absorbing unit 400 is provided for fixing the column bracket 222 to the vehicle body.

Namely, as shown in FIG. 14, in the initial impact absorbing unit 400, the capsule 410 includes an upper plate 411 having a plurality of protrusions 413 in the lower surface, a lower plate 412 which has a plurality of protrusions 413 in the upper surface, and an elastic portion 414 which integrally connects one side of the upper plate and one side of the lower plate.

In addition, as shown in FIG. 17, the capsule 410 has a certain width W between the end surface of the support member 461a of the upper plate 411 and the end surface of the support member 416b of the lower plate 412 when the upper plate 411 and the lower plate 412 are parallel. The above width W is smaller than a height H of the protrusions 413 formed in the upper plate 411 and the lower plate 412.

The width W is provided for preventing the protrusions of the upper plate 411 and the lower plate 412 from being broken due to an over engaging force of the bolt when the engaging bolt is inserted through the bolt hole 415 and is engaged to the vehicle body.

If the protrusions 413 of the upper plate 411 and the lower plate 412 are all broken and are engaged due to an over engaging force of the engaging bolt, the capsule 410 and the wing portions 222a of the column bracket 222 are not escaped from each other when an impact occurs, so that it is impossible to implement a desired impact absorbing function.

In addition, as shown in FIG. 14, the column bracket 222 of the present invention for using the capsule 410 includes a mounting groove 222c for mounting the capsule 410 therein in the surrounding portion of the slot 222b of the wing portion 222a, and the capsule 410 is inserted into the mounting groove 222c.

As show in FIG. 15, the through holes 222d corresponding to the position of the protrusions 413 of the capsule 410 are formed in the mounting groove 222c. Therefore, it is possible to engage the capsule in a state that the protrusions 413 are in the through holes 222d as shown in FIG. 17. In addition, as shown in FIG. 17, the through holes 222d may not be formed.

In the present invention, a lower side impact absorbing unit 500 is provided between the lower side tube 221 and the lower mounting bracket 223.

As shown in FIG. 18, a flat surface 221a is formed in an end portion of the lower side tube 221 based on a decrease of the outer diameter, and the lower mounting bracket 223 has an insertion hole 223a having a straight line inner diameter portion 223b to be matched with a cross section shape of the end portion in which the flat surface of the lower side tube is formed.

Therefore, when an impact occurs in the longitudinal direction of the column, the straight line inner diameter portion 223b of the insertion hole 223a goes into the cylindrical portion after the flat surface 221a. In this state, a friction force is increased for thereby absorbing the impact based on the friction force.

At this time, as shown in FIG. 19, the lower mounting bracket 223 may has an inner extended portion 223c formed by extending the inner circumference of the insertion hole 223a and bending the same in a certain direction for thereby enhancing a friction force.

In addition, The straight inner diameter portion 223b formed in the flat surface 221a of the end portion of the lower side tube 221 and the insertion hole 223a of the low mounting bracket 223 may be provided in multiple numbers at other positions as shown in FIG. 20.

The above construction is provided for maintaining a certain gap and preventing the initial friction inertia force from being maximized.

In FIG. 5, the reference numeral 600 represents a stopper unit for limiting the bending angles of the upper and lower directions of the tilt bracket 212.

The operations and operation states of the present invention will be described.

First, when adjusting the angle of the steering wheel by a driver, the handle 341 of the tilt lever 340 is pulled.

When the horizontal portion 342 of the tilt lever 340 is rotated about the hinge bolt 347, the inclination portion 346 formed in the extended portion 345 of the other side end pushes upwardly the side surface protrusion 324 protruded from the side of the driving gear 320 and pulls the wedge member 330 engaged with the protrusion 332 connected with the engaging hole 344 of the horizontal portion 342.

Therefore, since the lower surface wedge 331 of the wedge member 330 is distanced from the protrusion 323 of the upper surface of the driving gear 320, the driving gear 320 is lifted up, and the threaded portion 321 of the driving gear 320 which is lifted up is distanced from the threaded portion 311 of the fixing gear 310.

When the threaded portion 311 of the fixing gear 310 is distanced from the threaded portion 321 of the driving gear 320, as shown in FIG. 7, the upper side shaft 101 and the tilt bracket 212 and the upper unit 210 including a part of the tilting adjusting unit 300 may be upwardly rotated and lifted up about the hinge pin 201 which is a tilt hinge point or may be downwardly rotated.

In a state that the tilt lever 340 is pulled, when the upper unit is in a desired position by upwardly and downwardly adjusting the same, in the above state, the tilt lever 340 is placed down.

At the moment when the tilt lever 340 is placed down, the tilt lever 340 is returned by a force of the tilt lever returning spring 350, and when the tilt lever is returned, the horizontal portion 342 and the extended portion 345 of the other end are returned. In addition, the above operation is implemented in such a manner that the wedge member 330 in which the connection protrusion 332 is engaged to the engaging hole 344 of the horizontal portion 342 is pulled.

The wedge member 330 is downwardly rotated by downwardly pressing the protrusion 323 of the upper surface of the driving gear 320 using the wedge portion 331 of the lower surface. At this time, the inclination portion 346 of the retracted extended portion 345 allows the side surface protrusion 324 of the driving gear 320 to be downwardly moved.

Therefore, the wedge member 330 returning by the spring 350 is inserted between the guard portion 212d formed in the upper portion of the tilt bracket 212 and the protrusion 323 of the upper surface of the driving gear 320. Since the wedge portion 331 of the wedge member 330 presses the protrusion 323 of the upper surface of the driving gear 320, the driving gear 320 is downwardly pressed, and the threaded portion 321 of the driving gear 320 is engaged with the threaded portion 311 of the fixing gear 310 for thereby completing a tilting adjustment.

In the steering tilt assembly according to the present invention, when an impact is applied in the longitudinal direction of the shaft, the initial impact absorbing unit 400 is first operated, and at the same time the impact absorbing unit 500 of the lower side of the lower side tube is operated for thereby absorbing the impact.

First, in the initial impact absorbing unit 400, the left and right wing portions 222a of the column bracket 222 are escaped from the capsule 410 fixed to the vehicle body by a bolt based on a certain friction force.

Namely, since the protrusions 413 inwardly protruded from the upper plate 411 and the lower plate 412 of the capsule 410 are engaged before the same are fully pressed, the impact is absorbed based on a friction force of the protrusions. As shown in FIG. 15, in the case that a part of each protrusion 413 is inserted into the through hole 222d, since a friction force is larger, the initial impact absorbing force is large.

In addition, in the lower side impact absorbing unit 500, in a state that the straight line inner diameter portion 223b of the insertion hole 223a of the lower mounting bracket 223 is force-fit into the flat surface 221a of the end portion of the lower side tube 221, when an impact occurs, the straight line inner diameter portion 223b of the insertion hole 223a is distanced from the flat surface 221a and goes to the cylindrical portion. Therefore, since the same must overcome the change of the outer diameter and must advance, it is possible to absorb the impact.

As described above, in the present invention, since there are provided a wedge member adapted to press the driving gear in the upper portion of the tilt bracket and a guard portion adapted to press the wedge member, it is possible to implement a stable engaged state of the fixing gear and the driving gear for continuously implementing a certain tilting state. In addition, it is possible to enhance a stability of the tilting state.

In addition, in the present invention, since the upward rotation of the driving gear is directly operated by the tilt lever, it is possible to remove the part of the conventional rotation member. Therefore, it is possible to enhance the productivity and decrease the fabrication cost.

In addition, when rotatably engaging the tilt lever, since as the lever hinge bolt, the bolt having a straight line portion is used, the engaging force of the bolt does not affect the rotation friction of the horizontal portion when the tilt lever is rotated. Therefore, it is possible to prevent a noise in the tilt lever and prevent a bolt from being loosened.

In addition, since the capsule for the initial impact absorbing unit is formed of a metallic material without using a synthetic resin material, and there is provided a structure with protrusions, it is possible to implement an easier fabrication, and the price is low, and it is possible to implement an initial impact absorption based on only the friction force between the capsule and the mounting bracket.

In addition, since an engaging structure of the lower portion of the column and the lower bracket has a cross section portion with a decreased diameter and is directly engaged to the vehicle body through the lower bracket, it is possible to implement an impact absorbing unit without an additional inner tube inserted into the lower side of the lower side tube like the conventional art.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. In a steering column which comprises:
   a steering shaft which includes an upper side shaft and a lower side shaft connected with a universal joint in their lower and upper ends;
   an upper unit which is formed of an upper side tube which has a steering shaft inside and surrounds a portion of an upper side shaft, a tilt bracket connected with the upper side tube, and a shroud bracket for fixing the upper unit to a vehicle body;
   a lower unit which is formed of a lower side tube which surrounds a portion of a lower side shaft, a column bracket which is connected with an upper end of the lower side tube and has a capsule assembling slot in left and right wing portions, and a lower mounting bracket adapted to fix a lower end of the lower side tube to a vehicle body, wherein hinge pin holes formed in left and right sides of the tilt bracket and hinge pin holes formed in left and right sides of the column bracket are engaged using a hinge pin, so that the upper unit including the upper side shaft is bent at a certain angle about the hinge pin with respect to the lower unit including the lower side shaft,
   a vehicle steering tilt column assembly, comprising:
   a tilting adjusting means including:
       a fixing gear between the column bracket and the tilt bracket, said fixing gear being fixed to an upper surface of the column bracket and having a threaded portion in an upper side surface;
       a driving gear between the column bracket and the tilt bracket, said driving gear having a lower surface with a threaded portion engaged to the threaded portion of the fixing gear, a protrusion being formed in an upper surface of said driving gear, said driving gear being rotatable on the tilt bracket;
       a wedge member which has a wedge portion in a lower surface for pressing the protrusion of the driving gear and has a connection protrusion in a lower surface of a front end;
       a tilt lever which is formed of a horizontal portion having an engaging hole into which the connection protrusion of the wedge member is inserted and a hinge hole which is rotatable on the tilt bracket by inserting a hinge bolt, a handle portion extending from one end of the horizontal portion, and an extended portion which is connected with the other end of the horizontal portion and has an inclination portion for lifting up a side surface protrusion of the driving gear;

a spring for pulling the wedge member and the tilt lever in a certain direction; and an extension spring adapted to return the tilt lever to an original position when the tilt lever is rotated.

2. The assembly of claim 1, wherein said tilt bracket includes a horizontal guard portion for repressing a rising of the wedge member on an upper side of said tilt bracket.

3. The assembly of claim 1, wherein said hinge bolt is inserted into a hinge hole of the tilt lever and wherein a straight line portion of the hinge bolt has a length L larger than a thickness of the horizontal portion of the tilt lever and has a diameter D larger than a screw portion of the hinge bolt for thereby preventing a friction resistance with respect to a rotation of the tilt lever.

4. The assembly of claim 1, wherein said column bracket includes an initial impact absorbing means in such a manner that a capsule is inserted into the slot of the wing portion formed in left and right sides of said column bracket and is engaged to a vehicle body, wherein said capsule includes an upper plate having a lower surface formed with a plurality of protrusions, a lower plate having an upper surface formed with a plurality of protrusions, and an elastic portion which integrally connects one side of the upper plate and one side of the lower plate.

5. The assembly of claim 4, wherein said column bracket includes a mounting groove for mounting the capsule therein in a surrounding portion of the slot, and through holes corresponding to the positions of the protrusions of the capsule are formed in the mounting groove.

6. The assembly of claim 4, wherein said upper plate of said capsule has a center portion with an elliptical bolt hole for thereby forming an upper side support member in such a manner that an inner circumferential portion of the bolt hole is downwardly extended and wherein said lower elate of said capsule has a center portion with an elliptical bolt hole for thereby forming a lower side support member in such a manner that the inner circumferential portion of the bolt hole is upwardly extended, so that the upper plate and the lower plate are spaced apart by a certain distance by the upper and lower side support members.

7. The assembly of claim 6, wherein an end portion of the support member of the upper plate of the capsule and an end portion of the support member of the lower plate of the capsule have a certain width W therebetween which is not larger than a height H of the protrusions formed in the upper plate and the lower plate when the upper plate and the lower plate are disposed in parallel with each other.

8. The assembly of claim 1, wherein an impact absorbing means is provided between the lower side tube and the lower mounting bracket, and the lower side tube is formed in an integral shape and has an end portion of which an outer diameter is gradually decreased for thereby forming a flat surface therein, and the lower mounting bracket has an insertion hole having a straight line inner diameter portion for thereby matching with a cross section of the end portion of the flat surface of the lower side tube, so that in an assembled state of the impact absorbing means, the straight line inner diameter portion of the insertion hole escapes from the flat surface when an impact occurs for thereby increasing a friction force and absorbing the impact.

9. The assembly of claim 8, wherein the flat surface of the end portion of the lower side tube and said straight line inner diameter portions formed in the insertion hole of the lower mounting bracket have corresponding positions relative to each other and are formed in multiple numbers, respectively.

10. The assembly of claim 8, wherein an inner extended portion is extended from one side of an inner circumferential portion of the insertion hole for thereby enhancing a friction force.

* * * * *